(12) United States Patent
Morrison et al.

(10) Patent No.: US 8,858,130 B2
(45) Date of Patent: Oct. 14, 2014

(54) INDEXABLE CIRCULAR CUTTING INSERT

(75) Inventors: Lewis Ray Morrison, Latrobe, PA (US);
Howard Murphy, Northampton (GB);
Gianfranco Accardi, Milan (IT); Marco Procopio, Milan (IT); Andreas Lieber,
Zirndorf (DE); Juan Seculi, Nuremberg
(DE); Kumar Reddy Mylavaram Nikhilesh, Sahakamagar (IN)

(73) Assignee: Kennametal Inc., Latrobe, PA (US)

( * ) Notice: Subject to any disclaimer, the term of this patent is extended or adjusted under 35 U.S.C. 154(b) by 45 days.

(21) Appl. No.: 13/454,660

(22) Filed: Apr. 24, 2012

(65) Prior Publication Data
US 2013/0279994 A1 Oct. 24, 2013

(51) Int. Cl.
*B23C 5/08* (2006.01)
*B23C 5/20* (2006.01)

(52) U.S. Cl.
USPC ............. 407/113; 407/42; 407/48; 407/62

(58) Field of Classification Search
USPC ........... 407/113–116, 34, 40, 42, 48, 100, 61, 407/62
IPC ........................................ B23C 5/22,5/02, 5/08
See application file for complete search history.

(56) References Cited

U.S. PATENT DOCUMENTS

| | | | |
|---|---|---|---|
| 1,460,030 A * | 6/1923 | Mattson | 407/39 |
| 1,838,520 A | 12/1931 | Archer | |
| 2,392,216 A * | 1/1946 | Anania | 407/84 |
| 2,551,167 A * | 5/1951 | Rolland | 407/7 |
| 2,630,725 A | 3/1953 | Black | |
| 3,213,716 A * | 10/1965 | Getts | 408/229 |
| 3,408,722 A | 11/1968 | Berry, Jr. et al. | |
| 3,629,919 A | 12/1971 | Trevarrow, Jr. | |
| 3,831,237 A | 8/1974 | Gunsalus | |
| 3,842,470 A | 10/1974 | Hertel | |
| 3,875,663 A * | 4/1975 | Gustafson et al. | 407/114 |
| 3,946,474 A | 3/1976 | Hahn et al. | |
| 3,996,651 A | 12/1976 | Heaton et al. | |
| 4,189,264 A | 2/1980 | Kraemer | |

(Continued)

FOREIGN PATENT DOCUMENTS

CN 1623709 A 6/2005
DE 3321184 A1 12/1984

(Continued)

OTHER PUBLICATIONS

PCT/US2010/055247: International Search Report dated Jul. 21, 2011 (10 pages).

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

An indexable, invertable cutting insert has radially-oriented positioning segments on a front face of the insert and radially-oriented positioning segments on the back face of the insert. The radially-oriented positioning segments are shifted on the front face relative to those on the back face such that, when the cutting insert is engaged within the toolholder, the cutting segment utilized on the front face will never be directly opposite the cutting segment utilized on the back face. A toolholder system is made up of the cutting insert and a toolholder capable of securing and indexing the cutting insert.

11 Claims, 6 Drawing Sheets

(56) References Cited

U.S. PATENT DOCUMENTS

| | | | |
|---|---|---|---|
| 4,202,650 A | 5/1980 | Erickson | |
| 4,304,509 A | 12/1981 | Mori | |
| 4,315,706 A | 2/1982 | Erkfritz | |
| 4,632,593 A | 12/1986 | Stashko | |
| 4,636,116 A | 1/1987 | Shikata | |
| 4,812,087 A | 3/1989 | Stashko | |
| 4,880,338 A | 11/1989 | Stashko | |
| 4,915,548 A | 4/1990 | Fouquer et al. | |
| 4,934,844 A | 6/1990 | Orii | |
| 5,046,899 A | 9/1991 | Nishi | |
| 5,147,158 A | 9/1992 | Rivière | |
| 5,199,828 A | 4/1993 | Forsberg et al. | |
| 5,236,288 A | 8/1993 | Flueckiger | |
| 5,275,633 A | 1/1994 | Johansson et al. | |
| 5,346,336 A | 9/1994 | Rescigno | |
| D363,727 S | 10/1995 | DeRoche | |
| 5,478,175 A | 12/1995 | Kraemer | |
| 5,542,794 A | 8/1996 | Smith et al. | |
| 5,558,142 A | 9/1996 | Ehrle et al. | |
| 5,658,100 A | 8/1997 | Deiss et al. | |
| 5,702,210 A | 12/1997 | Boianjiu | |
| D390,578 S | 2/1998 | Satran et al. | |
| 5,716,167 A | 2/1998 | Siddle et al. | |
| 5,733,073 A | 3/1998 | Zitzlaff et al. | |
| 5,772,365 A | 6/1998 | Vogel et al. | |
| 5,772,366 A | 6/1998 | Wiman et al. | |
| D396,479 S * | 7/1998 | Satran et al. | D15/139 |
| 5,791,832 A * | 8/1998 | Yamayose | 407/113 |
| 5,810,518 A | 9/1998 | Wiman et al. | |
| 5,827,016 A | 10/1998 | Strand | |
| 5,836,723 A | 11/1998 | Von Haas et al. | |
| 5,846,032 A | 12/1998 | Murakami | |
| 5,888,029 A | 3/1999 | Boianjiu | |
| 5,915,889 A * | 6/1999 | Kress et al. | 407/114 |
| 5,931,613 A | 8/1999 | Larsson | |
| 5,934,844 A | 8/1999 | Woolley | |
| D416,917 S | 11/1999 | Xie et al. | |
| 6,050,751 A | 4/2000 | Hellstrom | |
| 6,053,671 A | 4/2000 | Stedt et al. | |
| 6,065,907 A * | 5/2000 | Ghosh et al. | 407/114 |
| 6,123,488 A * | 9/2000 | Kasperik et al. | 407/113 |
| 6,126,366 A | 10/2000 | Lundblad | |
| 6,152,658 A | 11/2000 | Satran et al. | |
| 6,158,928 A | 12/2000 | Hecht | |
| 6,164,878 A | 12/2000 | Satran et al. | |
| 6,168,356 B1 | 1/2001 | Sjoo et al. | |
| D442,193 S | 5/2001 | Isaksson | |
| 6,224,300 B1 | 5/2001 | Baxivanelis et al. | |
| 6,234,724 B1 | 5/2001 | Satran et al. | |
| 6,238,133 B1 | 5/2001 | DeRoche et al. | |
| 6,343,898 B1 | 2/2002 | Sjoo et al. | |
| 6,508,612 B1 | 1/2003 | Baca | |
| 6,543,970 B1 | 4/2003 | Qvarth et al. | |
| 6,579,042 B1 | 6/2003 | Shiraiwa | |
| D477,004 S | 7/2003 | Arvidsson | |
| 6,607,335 B2 | 8/2003 | Morgulis | |
| 6,840,716 B2 | 1/2005 | Morgulis et al. | |
| 6,926,472 B2 | 8/2005 | Arvidsson | |
| 6,929,428 B1 | 8/2005 | Wermeister et al. | |
| 6,948,889 B2 | 9/2005 | Arvidsson | |
| 7,021,871 B2 | 4/2006 | Arvidsson et al. | |
| D523,039 S | 6/2006 | Niebauer et al. | |
| 7,070,363 B2 | 7/2006 | Long, II et al. | |
| 7,073,987 B2 | 7/2006 | Hecht | |
| 7,121,771 B2 | 10/2006 | Englund | |
| 7,150,590 B2 * | 12/2006 | Schafer et al. | 409/234 |
| 7,156,006 B2 | 1/2007 | Hyatt et al. | |
| 7,168,895 B2 | 1/2007 | Koskinen et al. | |
| 7,300,232 B2 | 11/2007 | Wiman et al. | |
| 7,306,409 B2 | 12/2007 | Stabel et al. | |
| 7,325,471 B2 | 2/2008 | Massa et al. | |
| 7,381,015 B2 | 6/2008 | Jonsson | |
| 7,387,474 B2 | 6/2008 | Edler et al. | |
| 7,390,149 B2 | 6/2008 | Wihlborg | |
| 7,407,348 B2 | 8/2008 | Sjogren et al. | |
| 7,458,753 B1 | 12/2008 | Niebauer et al. | |
| 7,476,061 B2 | 1/2009 | Edler | |
| 7,513,717 B2 | 4/2009 | Engström et al. | |
| 7,530,769 B2 | 5/2009 | Kress et al. | |
| 7,578,639 B2 | 8/2009 | Wiman et al. | |
| 7,604,441 B2 | 10/2009 | Bhagath | |
| 7,607,867 B2 | 10/2009 | Benson | |
| 7,607,868 B2 | 10/2009 | Noggle | |
| 7,722,297 B2 | 5/2010 | Dufour et al. | |
| 7,785,045 B2 | 8/2010 | Viol | |
| D638,452 S | 5/2011 | Morrison et al. | |
| D640,717 S | 6/2011 | Morrison et al. | |
| 7,959,383 B2 | 6/2011 | Choi et al. | |
| 8,096,735 B2 | 1/2012 | Sladek et al. | |
| D658,218 S | 4/2012 | Morrison | |
| 8,147,171 B2 | 4/2012 | Dufour et al. | |
| D673,194 S | 12/2012 | Kovac et al. | |
| 8,408,848 B2 * | 4/2013 | Hecht | 407/115 |
| 8,430,607 B2 | 4/2013 | Jansson | |
| 8,573,903 B2 * | 11/2013 | Morrison et al. | 407/113 |
| 8,657,539 B2 * | 2/2014 | Morrison et al. | 407/113 |
| 2003/0086766 A1 | 5/2003 | Andras | |
| 2003/0219319 A1 | 11/2003 | Arvidsson | |
| 2004/0028486 A1 | 2/2004 | Englund | |
| 2005/0019110 A1 | 1/2005 | Astrakhan | |
| 2005/0019113 A1 | 1/2005 | Wermeister | |
| 2005/0084342 A1 | 4/2005 | Festeau et al. | |
| 2005/0152754 A1 | 7/2005 | Wiman et al. | |
| 2005/0244233 A1 | 11/2005 | Jonsson | |
| 2006/0088390 A1 | 4/2006 | Wallstrom et al. | |
| 2006/0147280 A1 | 7/2006 | Sjogren et al. | |
| 2006/0245837 A1 | 11/2006 | Dufour et al. | |
| 2006/0269374 A1 | 11/2006 | Dufour et al. | |
| 2007/0009334 A1 | 1/2007 | Edler | |
| 2007/0071559 A1 | 3/2007 | Koskinen | |
| 2007/0101837 A1 * | 5/2007 | Hyatt et al. | 82/1.11 |
| 2007/0122242 A1 | 5/2007 | Englund et al. | |
| 2007/0189862 A1 | 8/2007 | Viol | |
| 2007/0245535 A1 | 10/2007 | Noggle | |
| 2008/0056831 A1 | 3/2008 | Wiman et al. | |
| 2008/0181731 A1 | 7/2008 | Wallstrom et al. | |
| 2008/0193233 A1 | 8/2008 | Park | |
| 2008/0317558 A1 | 12/2008 | Niebauer et al. | |
| 2009/0052998 A1 | 2/2009 | Sladek et al. | |
| 2009/0097929 A1 | 4/2009 | Festeau et al. | |
| 2009/0290946 A1 | 11/2009 | Zastrozynski | |
| 2010/0034602 A1 | 2/2010 | Sung et al. | |
| 2010/0061816 A1 | 3/2010 | Koerner et al. | |
| 2010/0158620 A1 | 6/2010 | Spitzenberger et al. | |
| 2010/0183386 A1 | 7/2010 | Heinloth et al. | |
| 2010/0239379 A1 | 9/2010 | Choi et al. | |
| 2010/0247257 A1 | 9/2010 | Paul et al. | |
| 2011/0103905 A1 | 5/2011 | Morrison et al. | |
| 2011/0116878 A1 | 5/2011 | Ebert et al. | |
| 2011/0164934 A1 | 7/2011 | Chen et al. | |
| 2012/0003493 A1 | 1/2012 | Schon et al. | |
| 2012/0251250 A1 * | 10/2012 | Morrison et al. | 407/42 |
| 2013/0195569 A1 * | 8/2013 | Gey et al. | 407/113 |
| 2013/0251463 A1 * | 9/2013 | Harif | 407/11 |

FOREIGN PATENT DOCUMENTS

| | | |
|---|---|---|
| DE | 4244316 A1 | 6/1994 |
| DE | 19506944 A1 | 8/1995 |
| DE | 69901623 T2 | 11/2002 |
| DE | 102005025815 A1 | 12/2006 |
| DE | 102006011581 A1 | 9/2007 |
| DE | 102008037915 B3 | 8/2009 |
| DE | 102009049088 A1 | 4/2011 |
| EP | 300172 A2 | 1/1989 |
| EP | 0599393 A1 | 6/1994 |
| EP | 0698437 A1 | 2/1996 |
| EP | 730926 A1 | 9/1996 |
| EP | 1468770 A1 | 10/2004 |
| EP | 1535681 A1 | 6/2005 |
| JP | 63142944 A | 6/1988 |
| JP | 06190608 A * | 7/1994 |
| JP | 7299633 A | 11/1995 |
| JP | 1119817 A | 4/1999 |

(56) References Cited

FOREIGN PATENT DOCUMENTS

| | | | |
|---|---|---|---|
| JP | 11245105 A | 9/1999 | |
| JP | 1310808 A | 11/1999 | |
| KR | 1020060019993 A | 3/2006 | |
| SE | 533249 A1 | 7/2010 | |
| WO | 9415741 A1 | 7/1994 | |
| WO | 0128722 A1 | 4/2001 | |
| WO | 2005068116 A1 | 7/2005 | |
| WO | 2007037733 A1 | 4/2007 | |
| WO | 2007104275 A1 | 9/2007 | |
| WO | 2007127109 A2 | 11/2007 | |
| WO | 2008029964 A1 | 3/2008 | |
| WO | 2010017859 A1 | 2/2010 | |

OTHER PUBLICATIONS

English Machine Translation of DE 10 2005 025 815.
English Machine Translation of DE 10 2006 011 581.

* cited by examiner

INDEXABLE CIRCULAR CUTTING INSERT

BACKGROUND OF THE INVENTION

1. Field of the Invention

This invention relates to cutting inserts and is specifically directed to an invertable, indexable, circular cutting insert which, when inverted, is designed to engage a cutting region longitudinally shifted from a cutting region that may be utilized on the opposite side of the insert. The invention also relates to a toolholder system utilizing the subject cutting insert mounted within a toolholder, such as a milling cutter.

2. Description of Related Art

Milling cutters for cutting and shaping metal workpieces have been known for many years. Such milling cutters generally comprise a cylindrical cutting body having a plurality of insert seats spaced around the periphery of the body. Cutting inserts are mounted within the insert seats and the insert seats are oriented so that the inserts mounted therein will effectively cut a workpiece when a cutter body is rotated along a longitudinal axis. In one embodiment, circular cutting inserts are used within the pockets and indexed at such time as a portion of the cutting edge is worn. Oftentimes, such circular inserts are not only indexable, but also invertable. As a result, when a particular edge is worn, the insert may be inverted to engage a cutting edge on the opposite side of the insert. In previous designs, however, the portion of the cutting edge that engaged the workpiece on one side of the cutting insert was longitudinally opposite the portion of the cutting edge on the opposite side which engaged the workpiece. As a result, when the cutting edge on the first side was utilized, the cutting edge and the region adjacent to the cutting edge was subjected to high temperatures and extreme conditions, which tended to degrade not just the cutting edge, but the material in the region of the cutting edge. When the insert was inverted and the cutting edge longitudinally opposite to the spent region was employed, the life of that cutting edge was reduced because the material in the region proximate to that cutting edge had been previously degraded through the use of the cutting edge on the opposing side.

A need exists to better utilize the cutting edges on a circular, indexable cutting insert that is reversible to minimize degradation of the region proximate to a cutting edge when the cutting insert is inverted.

SUMMARY OF THE INVENTION

One embodiment of the subject invention is directed to an indexable cutting insert having a generally cylindrically shaped body with a central longitudinal axis extending therethrough. The body has a front face, an opposing back face, and a side wall therebetween. The body also has a front cutting edge at the intersection of the sidewall and the front face and a back cutting edge at the intersection of the sidewall and the back face. A plurality of front positioning segments are on the front face, wherein the front segments have centerlines and wherein the centerlines of adjacent segments define evenly spaced radial angles RA about the central longitudinal axis for indexing the insert within a toolholder. A plurality of back positioning segments are on the back face, wherein the back segments have centerlines and wherein the centerlines of adjacent segments define evenly spaced radial angles RB about the central longitudinal axis for indexing the insert within a toolholder. The centerlines of the back positioning segments, when projected along the central longitudinal axis through the body onto the front face, bisect the radial angles RA defining the front positioning segments.

A second embodiment of the subject invention is directed to a toolholder system for cutting a workpiece, wherein there is relative rotation between the toolholder and the workpiece. The toolholder system is comprised of at least one cutting insert having a front face, an opposing back face, and a side wall therebetween. The cutting insert also has a front cutting edge at the intersection of the sidewall and the front face and a back cutting edge at the intersection of the sidewall and the back face. A plurality of front positioning segments are on the front face, wherein the front segments have radial centerlines and, wherein the centerlines of adjacent segments define evenly spaced radial angles RA about the central longitudinal axis for indexing the insert within a toolholder, wherein the front positioning segments define a front pattern. A plurality of back positioning segments are on the back face, wherein the back segments have centerlines and, wherein the centerlines of adjacent segments define evenly spaced radial angles RB about the central longitudinal axis for indexing the insert within a toolholder, wherein the back positioning segments define a back pattern identical to that of the front pattern. The centerlines of the back positioning segments, when projected along the central longitudinal axis through the body onto the front face, bisect the radial angles RA defining the front positioning segments. A toolholder has at least one seat for securably holding a circular cutting insert, wherein each of the at least one seats includes a bottom wall for engaging one of the front face and the back face of an insert, wherein the bottom wall further includes a plurality of receiving segments positioned upon the bottom wall in the same pattern as the front pattern and the back pattern.

DESCRIPTION OF THE PREFERRED EMBODIMENTS

Figure 1:
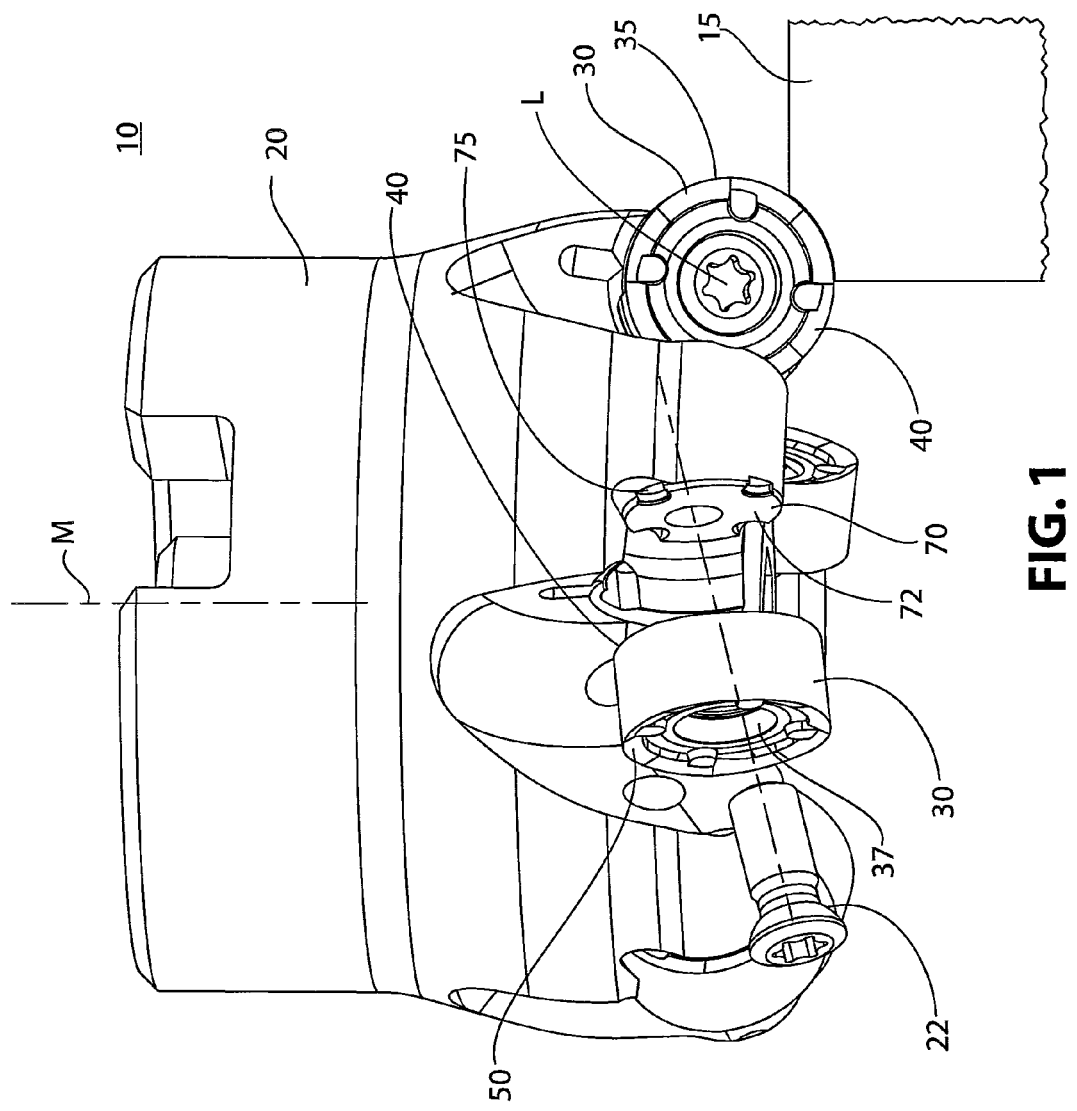
FIG. 1 is a perspective view of a cutting insert in accordance with the subject invention mounted within a milling cutter.

FIG. 1 illustrates a toolholder system 10 for cutting a workpiece 15, wherein there is relative rotation between a toolholder 20 and the workpiece 15. The toolholder system 10 is comprised of at least one cutting insert 30 and the toolholder 20. The toolholder 20 illustrated in FIG. 1 is a milling cutter that rotates about axis M.

Directing attention to FIGS. 2-6, the cutting insert 30 has a body 35 with a front face 40, an opposing back face 50, and a side wall 60 therebetween. At the intersection of the sidewall 60 and the front face 40 is a front cutting edge 42. At the intersection of the sidewall 60 and the back face 50 is a back cutting edge 52. A plurality of positioning segments 44A-D, on the front face 40, have radial centerlines 45A-D extending from the longitudinal axis L, wherein the centerlines 45A-D of adjacent segments 44A-D define evenly-spaced radial angles RA about the central longitudinal axis L for indexing the cutting insert 30 within the toolholder 20. The front positioning segments 44A-D define a front pattern.

Additionally, a plurality of back positioning segments 54A-D on the back face 50 have radial centerlines 55A-D extending from the longitudinal axis L, wherein the centerlines 55A-D of adjacent segments 54A-D define evenly-spaced radial angles RB about the central longitudinal axis L for indexing the cutting insert 30 within the toolholder 20. The back positioning segments 54A-D define a back pattern identical to that of the front pattern.

Figure 5:
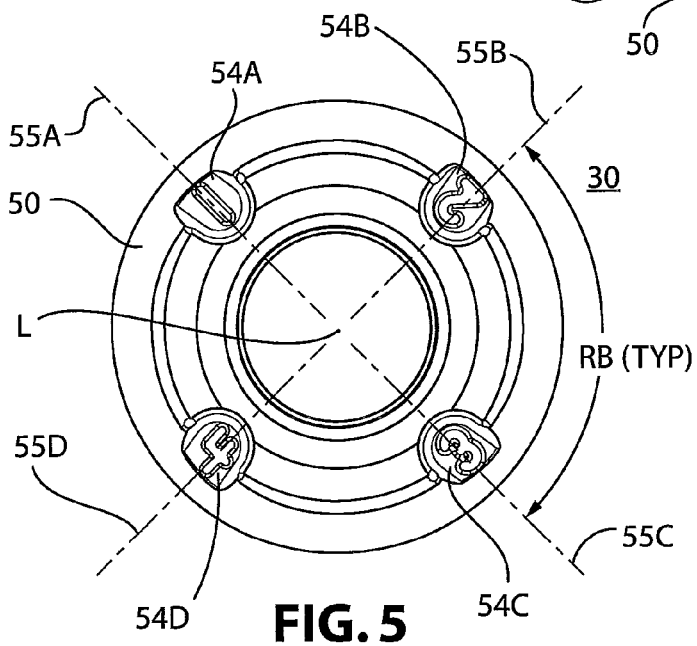
FIG. 5 is a back view of the cutting insert illustrated in FIG. 2.
Figure 7:
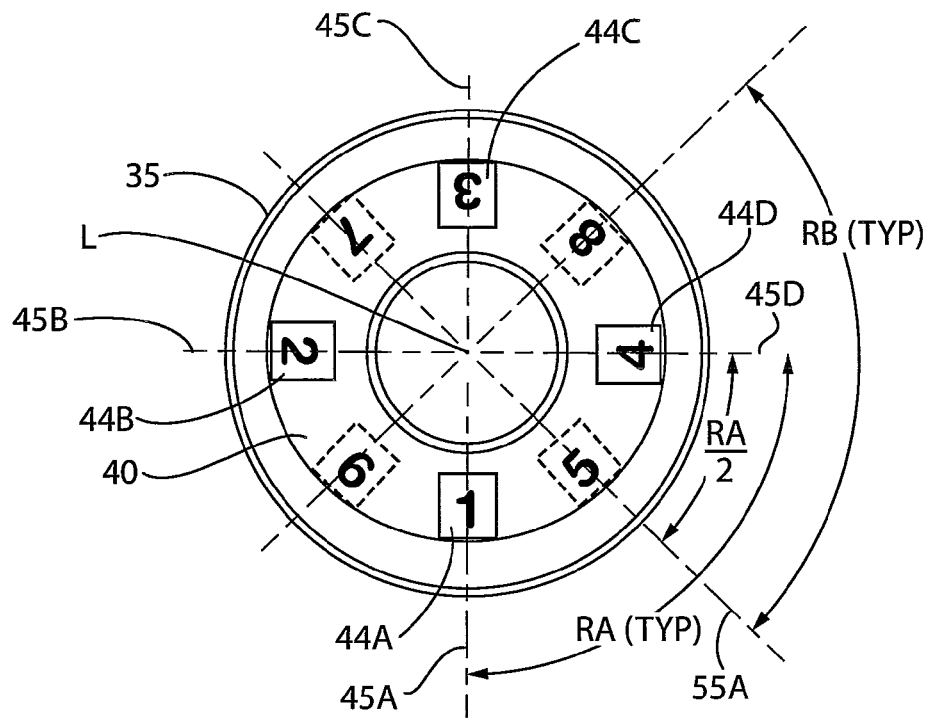
FIG. 7 is a front view of the cutting insert in accordance with the subject invention showing the positioning segments in schematic.
Figure 8:
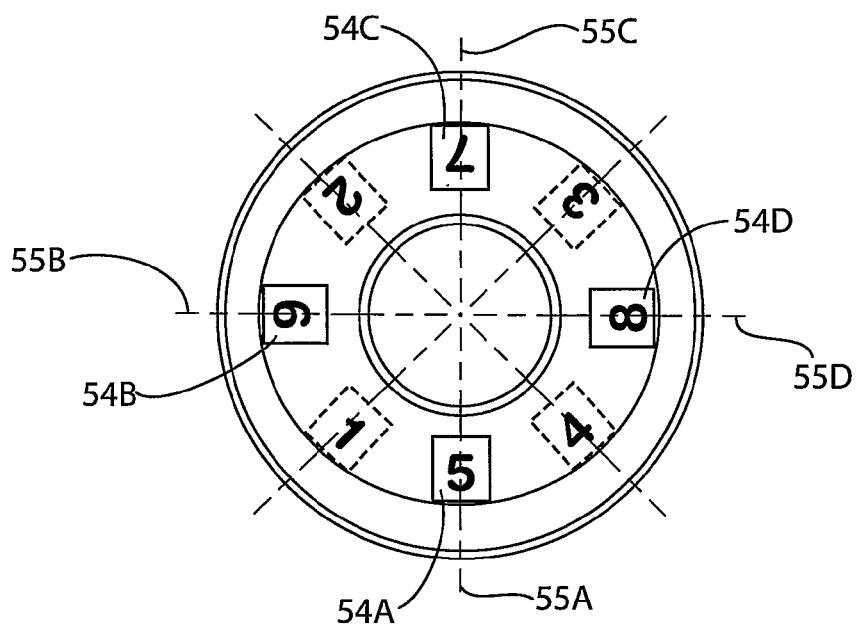
FIG. 8 is a back view of the cutting insert illustrated in FIG. 7.

FIGS. 7 and 8 illustrate the cutting insert 30 in accordance with the subject invention, whereby the positioning segments 44A-D and 54A-D are illustrated schematically and identify with the numbers 1-4 on the front face 40 and the numbers 1-4 on the back face 50, respectively. As illustrated in FIG. 5 with respect to the back segment centerline 55A and representative of the other back face positioning segments, the centerlines 55A-D of the back positioning segments 54A-D, when projected along the central longitudinal axis L through the body 35 onto the front face 40, illustrated as phantom lines, bisect the radial angles RA defining the front positioning segments 54A-D, as illustrated by the angle RA/2 between lines 55A and 45D.

Figure 9:
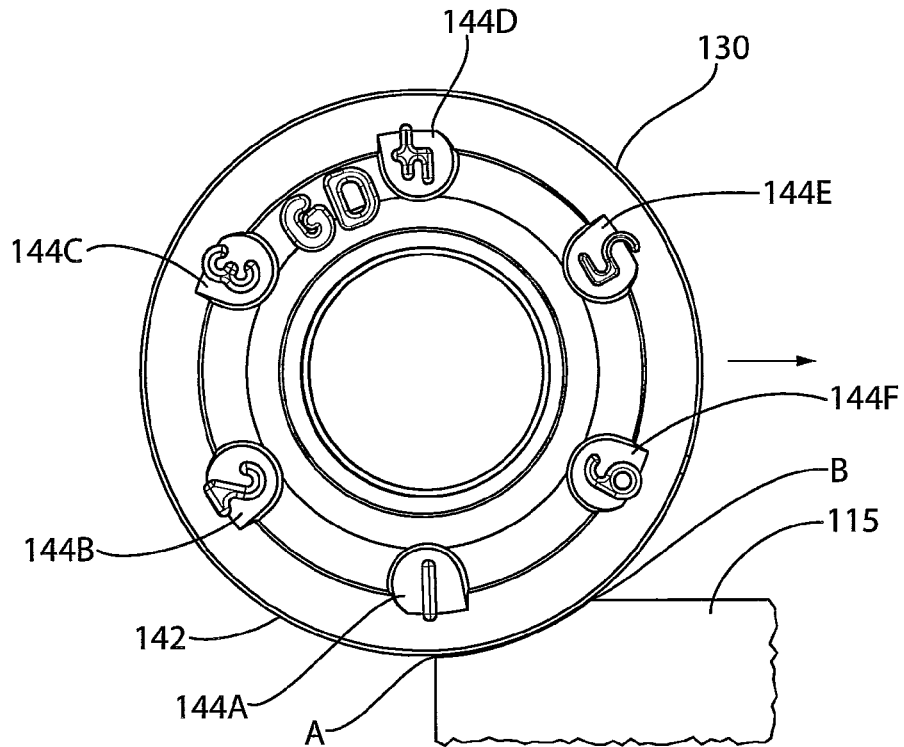
FIG. 9 is a front view of a prior art cutting insert.
Figure 10:
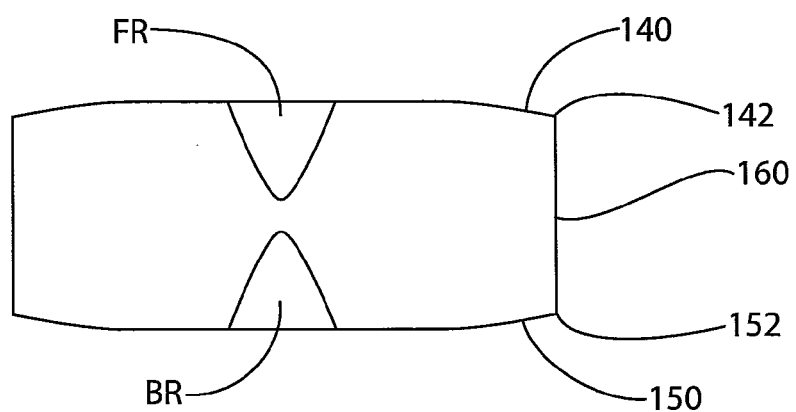
FIG. 10 is a side view of the cutting insert illustrated in FIG. 9.

FIGS. 9 and 10 illustrate a front view and side view of a prior art insert, and the benefits of the subject invention will be described with respect to this prior art insert.

The cutting insert 130 again has a front face 140 and a back face 150 with a front cutting edge 142 and a back cutting edge 152 defined by the intersection of the sidewall 160 with the front face 140 and the back face 150, respectively. However, when the cutting insert 130 is presented to the workpiece 115, the cutting edge 142 of the front face 140 engages the workpiece between, for example, points A and B on the cutting edge 142. As a result, the primary wear to the cutting insert 130 is on the cutting edge 142 between points A and B. In particular, the most severe wear occurs in the region of point A because, not only is that region the first to encounter the workpiece, but, furthermore, when the cutting insert is used for multiple machining operations at different depths of the cut, point A is always exposed to that workpiece, while point B may or may not be exposed depending upon the depth of the cut. Therefore, the region proximate to point A is repeatedly heated and repeatedly subjected to extreme conditions. This region of thermal degradation is represented by FR in FIG. 10. As can be seen in FIG. 9, cutting insert 130 is indexable and, as a result, may be rotated to six different positions to expose the workpiece 115 to a fresh cutting edge when the insert 130 is indexed.

However, the insert is also invertable and, in this prior art design, the positioning segments 144A-F are positioned at identical radial locations about the longitudinal axis L as the positioning segments (not shown) on the back face 150. When the insert 130 is indexed to engage a cutting edge 152 proximate to a front region FR that is already thermally degraded, then it is likely that that thermal degradation has extended into the back region BR associated with the cutting edge 152 of the back face 150. As a result, the back region has already experienced a level of thermal degradation such that the cutting edge associated with that back region may prematurely wear.

The inventors have discovered that, in view of the thermal degradation associated with the front region FR and the back region BR and the degradation to a later-used cutting edge, it is possible to design the cutting insert such that the usable cutting edge is radially shifted. With the cutting edge shifted, then even though there is thermal degradation on one side of the cutting insert, the thermal degradation on the opposite side of the cutting insert may be radially shifted so that it does not affect the integrity of a cutting edge on the opposite of the insert.

Figure 11:
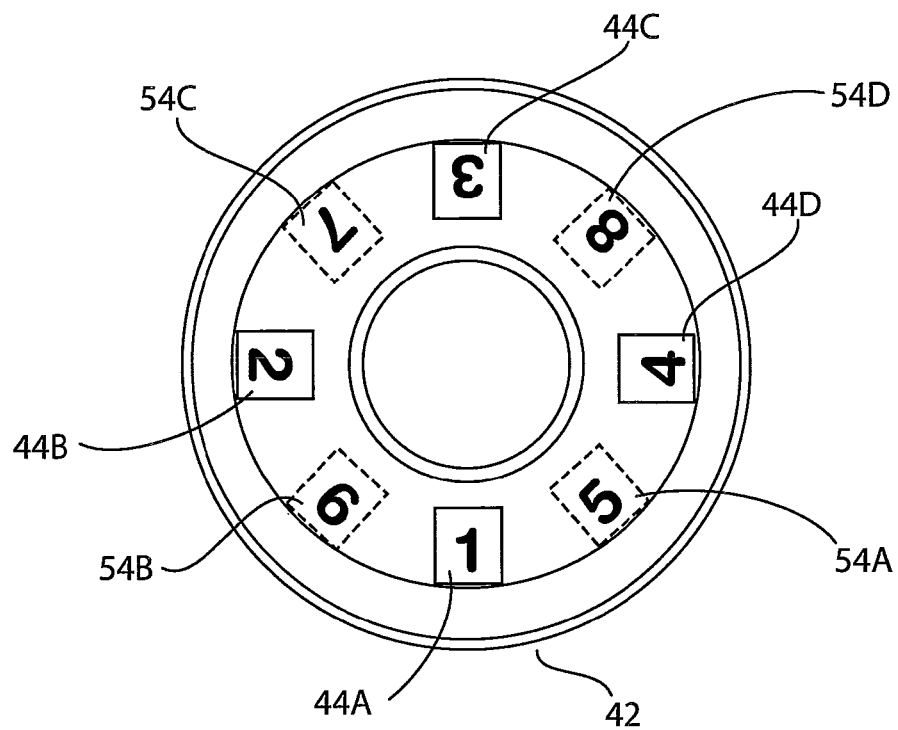
FIG. 11 is identical to FIG. 7 and will be used to compare against FIG. 12.
Figure 12:
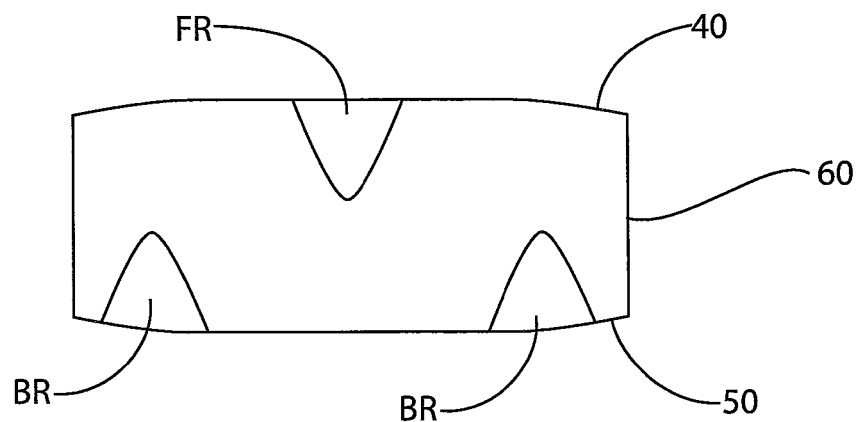
FIG. 12 is a back view of the cutting insert illustrated in FIG. 11 and illustrated side-by-side with FIG. 11 to highlight the differences.

Directing attention to FIGS. 11 and 12 and expanding upon the description provided with FIGS. 7 and 8, the cutting edge 42 associated with the positioning segment 44A will produce a region FR of degradation. However, when the insert is inverted, the cutting edge directly opposite the front region FR will not be utilized, since the positioning segments 54A-D on the back space 50 are shifted relative to the positioning segments 44A-D on the front face 40. Therefore, the back region BR, where the thermal degradation occurs, will also be shifted, such that, even though these regions still exist, they are radially shifted from the front region FR. Therefore, the thermal degradation has a minimum impact on integrity of the cutting edge utilized on the opposite face of the insert.

Briefly returning to FIG. 1, the toolholder 20 has at least one seat 70 for securably holding the cutting insert 30. The seat 70 includes a bottom wall 72 for engaging one of the front face 40 and the back face 50 of the insert 30 non-rotatable about the insert central longitudinal axis L, wherein the bottom wall 72 further includes a plurality of receiving segments 75 positioned upon the bottom wall 72 in the same pattern as the front pattern of the front face 40 and the back pattern of the back face 50. As a result, it can be appreciated that the cutting insert 30 is not only indexable about its longitudinal axis L, but, furthermore, is invertable, such that, at least with respect to cutting insert 30 illustrated in FIG. 1, there are eight useful cutting edges provided by this indexable, invertable cutting insert 30.

Redirecting attention to FIG. 1 and FIGS. 2-6, the front positioning segments 44A-D and the back positioning segments 54A-D are projections extending from the respective front face 40 and back face 50. In the alternative, however, it should be easily envisioned and obvious to one skilled in the art that the front positioning segments 44A-D and the back positioning segments 54A-D may be indentations extending into the respective faces 40, 50.

Figure 2:
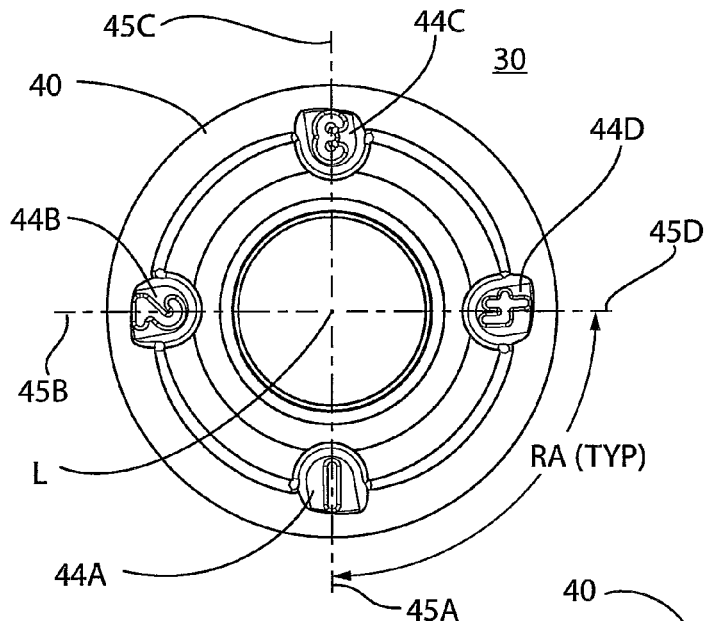
FIG. 2 is a front view of a cutting insert in accordance with the subject invention.
Figure 4:
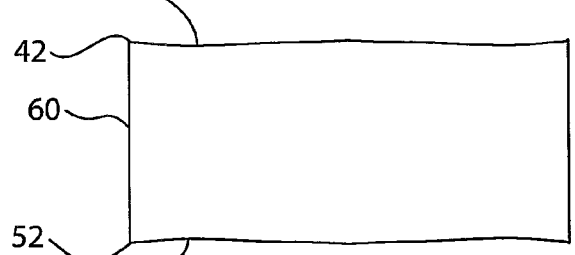
FIG. 4 is a side view of the cutting insert illustrated in FIG. 2.
Figure 3:
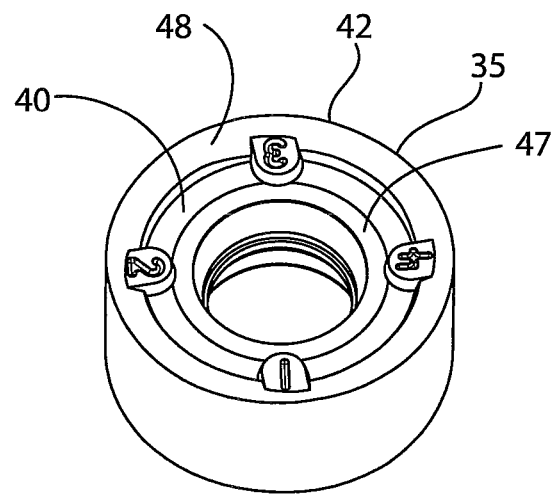
FIG. 3 is a front perspective view of the cutting insert illustrated in FIG. 2.
Figure 6:
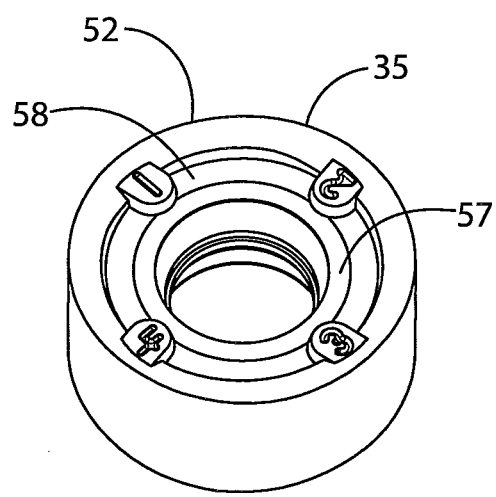
FIG. 6 is a back perspective view of the cutting insert illustrated in FIG. 2.

As seen in FIGS. 2 and 3, the front face 40 has a floor 47 spaced from the cutting edge 42 with a sloped wall 48 therebetween and, wherein the positioning segments 44A-D extend from or into the floor 47, depending upon whether they are projections or indentations. Furthermore, the back face 50 has a floor 57 spaced from the cutting edge 52 with a sloped wall 58 therebetween and the positioning segments 54A-D extend from or into the floor 57, depending upon whether they are projections or indentations.

As generally illustrated in FIGS. 2 and 5, the positioning segments 44A-D and 54A-D are generally U-shaped. Additionally, the positioning segments are intended to rotationally locate and fix the cutting inserts within the pocket of the toolholder and may have a number of different shapes to achieve this goal. United States Patent Application Publication No. 2011/0103905 assigned to the assignee of the present application illustrates, among other things, a round cutting insert with anti-rotational features and is hereby incorporated by reference. Furthermore, as illustrated in FIGS. 2 and 5, the segments 44A-D include indicia to uniquely identify each segment 44A-D on the front face 40 and each segment 54A-D on the back face 50. As illustrated in FIGS. 2 and 5, the indicia may be numbers.

As shown in FIG. 7, the radial angles RA formed on the front face 40 are equal to the radial angles RB formed on the back face 50.

Directing attention to FIG. 1, the body 35 has a central bore 37 extending therethough along the longitudinal central axis L to accommodate a hold-down bolt 22 for securing the body 35 to the toolholder 20.

As illustrated in FIGS. 2 and 5, there are four positioning segments 44A-D on the front face 40 and four positioning segments 54A-D on the back face 50 of the body 35. Each segment forms an angle RA, RB of 90° with an adjacent segment on the respective face.

The prior art example, illustrated in FIG. 9, illustrates six positioning segments on the front face 140 and six positioning segments (not shown) on the back face 150. It can be appreciated, based on the foregoing discussion and in accordance with the subject invention, that the positioning segments on the front face 140 may be radially shifted with respect to the positioning segments on the back face 150 to shift the front region FR relative to the back region BR to minimize the impact of thermal degradation from one side of the insert to the other side of the insert. Although not illustrated, once again, it may be easily envisioned and would be obvious to one skilled in the art to increase the number of positioning segments to eight on each side, whereby each segment would form an angle of 45° with an adjacent segment on the respective face and segments on opposite sides would be offset in accordance with the subject invention.

It should further be appreciated that, while the subject invention has been discussed with respect to a milling cutter, the subject invention may be applied to any number of toolholders utilizing indexable, invertable, circular cutting inserts. For example, a square shank toolholder may be used.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A toolholder system for cutting a workpiece, wherein there is relative rotation between the toolholder and the workpiece, wherein the toolholder system is comprised of:
   a) at least one circular cutting insert having:
      1) a front face, an opposing back face, a side wall therebetween and a central longitudinal axis therethrough;
      2) a front cutting edge at the intersection of the sidewall and the front face;
      3) a back cutting edge at the intersection of the sidewall and the back face;
      4) a plurality of front positioning segments on the front face, wherein the front segments have radial centerlines and, wherein the centerlines of adjacent segments define evenly spaced radial angles RA about the central longitudinal axis for indexing the insert within a toolholder, wherein the front positioning segments define a front pattern;
      5) a plurality of back positioning segments on the back face, wherein the back segments have radial centerlines and, wherein the radial centerlines of adjacent segments define evenly spaced radial angles RB about the central longitudinal axis for indexing the insert within a toolholder, wherein the back positioning segments define a back pattern identical to that of the front pattern; and
      6) wherein the radial centerlines of the back positioning segments, when projected along the central longitudinal axis through the body onto the front face, bisect the radial angles RA defining the front positioning segments; and
   b) a toolholder having at least one seat securably holding the at least one circular cutting insert non-rotatable about the insert central longitudinal axis, wherein each of the at least one seats includes a bottom wall for engaging one of the front face and the back face of an insert, wherein the bottom wall further includes a plurality of receiving segments positioned upon the bottom wall in the same pattern as the front face and the back face and wherein the at least one cutting insert is indexably secured to the toolholder such that during a cutting operation, when mounted with the front face exposed, a portion of the front face cutting edge is available to the workpiece and when the same insert is inverted with the back face exposed, a portion of the back face cutting edge is available to the workpiece, wherein the front face portions and the back face portions available to the workpiece are always radially shifted from one another.

2. The toolholder system according to claim 1, wherein for the at least one cutting insert the front positioning segments and the back positioning segments are projections extending from the respective faces.

3. The toolholder system according to claim 1, wherein for the at least one cutting insert the front positioning segments and the back positioning segments are indentations extending into the respective faces.

4. The toolholder system according to claim 1, wherein for the at least one cutting insert the segments are generally U-shaped.

5. The toolholder system according to claim 1, wherein for the at least one cutting insert the segments include indicia to uniquely identify each segment on a face.

6. The toolholder system according to claim 5, wherein for the at least one cutting insert the indicia are numbers.

7. The toolholder system according to claim 1, wherein for the at least one cutting insert the radial angles RA formed on the front face have equal increments to the radial angles RB formed on the back face.

8. The toolholder system according to claim 1, wherein for the at least one cutting insert the body has a central bore extending therethrough along the longitudinal central axis to accommodate a hold-down bolt for securing the body to a toolholder.

9. The toolholder system according to claim 1, wherein for the at least one cutting insert there are four positioning segments on the front face and four positioning segments on the back face of the body, wherein each segment forms an angle of 90 degrees with an adjacent segment on the respective face.

10. The toolholder system according to claim 1, wherein for the at least one cutting insert there are six positioning segments on the front face and six positioning segments on the back face of the body, wherein each segment forms an angle of 60 degrees with an adjacent segment on the respective face.

11. The toolholder system according to claim 1, wherein for the at least one cutting insert there are eight positioning segments on the front face and eight positioning segments on the back face of the body, wherein each segment forms an angle of 45 degrees with an adjacent segment on the respective face.

* * * * *